United States Patent [19]

Nakanishi

[11] Patent Number: 5,208,841
[45] Date of Patent: May 4, 1993

[54] SOLID STATE IMAGING ELEMENT WITH BUS BREAKAGE DETECTOR

[75] Inventor: Junji Nakanishi, Itami, Japan

[73] Assignee: Mitsubishi Denki Kabushiki Kaisha, Tokyo, Japan

[21] Appl. No.: 772,887

[22] Filed: Oct. 8, 1991

[30] Foreign Application Priority Data

Nov. 14, 1990 [JP] Japan .................................. 2-311107

[51] Int. Cl.⁵ ....................... G11C 19/28; H01C 29/78
[52] U.S. Cl. ........................................ 377/60; 257/24; 257/231; 257/292
[58] Field of Search ................ 357/24, 30; 377/57-63

[56] References Cited

U.S. PATENT DOCUMENTS

| | | | |
|---|---|---|---|
| 4,291,337 | 9/1981 | Takamura et al. | 357/24 |
| 4,581,539 | 4/1986 | Kimata | 357/24 |
| 4,584,608 | 4/1986 | Soneda et al. | 357/24 |
| 4,589,024 | 5/1986 | Koch et al. | 357/24 |
| 4,866,497 | 9/1989 | Kosonocky | 357/24 |
| 4,940,934 | 7/1990 | Kawaguchi et al. | 324/158 R |
| 4,954,895 | 9/1990 | Akimoto et al. | 357/24 |
| 5,060,038 | 10/1991 | Kimata et al. | 357/24 |

FOREIGN PATENT DOCUMENTS 0202905 11/1986 European Pat. Off. .
61-226955 10/1986 Japan .

OTHER PUBLICATIONS

Kimata et al, "A 480×480 Element Image Sensor with a Charge Sweep Device", IEEE International Solid-State Circuits Conference, 1985, pp. 100-101.
Kimata et al, "A 512×512 Element PtSi Schottky-Barrier Infrared Image Sensor", IEEE Journal of Solid-State Circuits, vol. SC-22, No. 6, 1987, pp. 1124-1129.

Primary Examiner—Gene M. Munson
Attorney, Agent, or Firm—Leydig, Voit & Mayer

[57] ABSTRACT

A solid state imaging element includes a plurality of photodetectors arranged in a two-dimensional array on a semiconductor substrate, first and second charge transfer circuits for transferring signal charges in a vertical direction and a horizontal direction, respectively, a plurality of transfer gates for controlling charge transfer from the photodetectors to the first charge transfer circuit, a scanner for controlling switching of the transfer gates, a plurality of bus lines connecting the transfer gates with the scanner, and a bus line breakage checking circuit. The bus line breakage checking circuit includes a plurality of transistors connected in series with respective bus lines, a test pad connected with the bus lines through the transistors, and a voltage applying pad for applying a voltage to control switching of the transistors. Therefore, the breakage of a bus line can be detected in a wafer test without actually operating the element, whereby time and money are saved.

13 Claims, 11 Drawing Sheets

F I G. 3
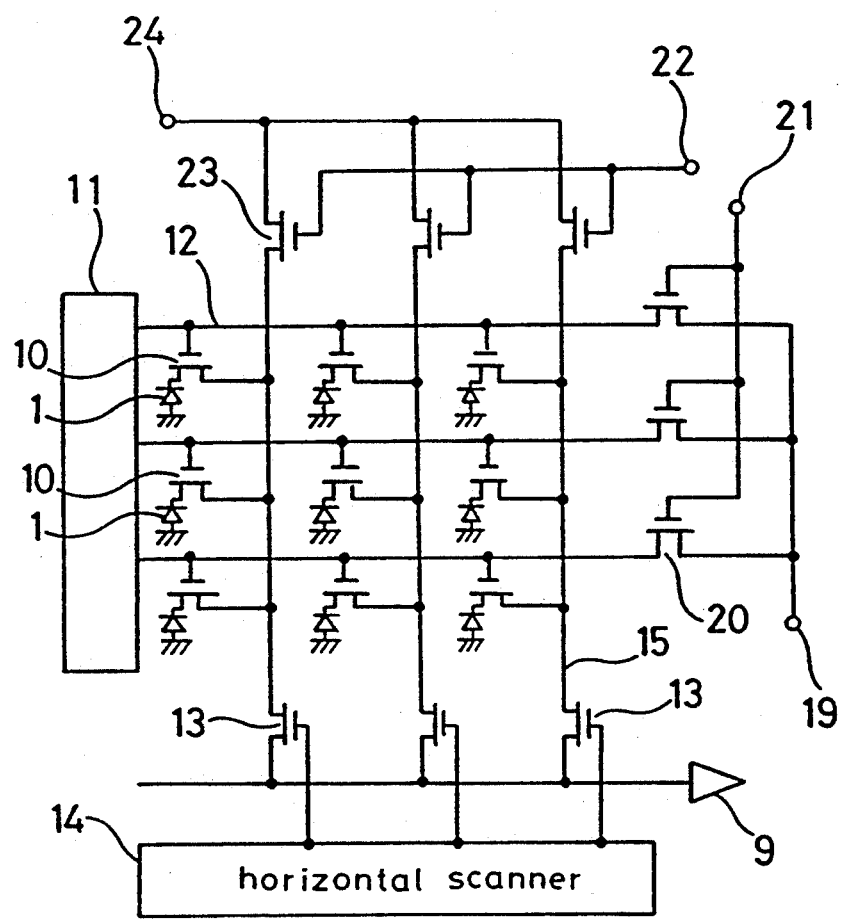

SOLID STATE IMAGING ELEMENT WITH BUS BREAKAGE DETECTOR

FIELD OF THE INVENTION

The present invention relates to a solid state imaging element which can be easily tested.

BACKGROUND OF THE INVENTION

Recently, accompanying the advance of silicon LSI technology, solid state imaging elements in which a plurality of photodetectors are arranged in a two-dimensional array on a semiconductor substrate and connected with a charge sweep device (hereinafter referred to as CSD) or a charge coupled device (hereinafter referred to as CCD) have been developed and put into practical use. Schottky-barrier diodes or photodiodes utilizing p-n junctions are usually employed for the photodetectors. Such solid state imaging elements are called "infrared imaging elements" or "visible light imaging elements" depending on the wavelength to be detected.

FIG. 12 is a block diagram of an infrared CSD imaging device in which a plurality of infrared detectors are arranged on a silicon substrate and scanning is carried out using CSD, disclosed in pages 42 to 48 of Defense Technology Journal, Vol.8, No.8, August 1987, published by Defense Technology Foundation. This device is constituted by a camera head 30, a signal processing part 31 and a monitor TV 33. In addition, this device employs a 512×512-element two-dimensional array type IRCSD (Infrared CSD) 32 as the imaging element. Since this IRCSD 32 scans electrically, a mechanical scanner is dispensed with, resulting in a small sized and light-weight camera head 30. In addition, since the camera head 30 includes a Stirling cycle refrigerator 302 utilizing a closed cycle for cooling the infrared detectors down to 77K, it is not necessary to provide a cooler.

An interline transfer CCD (hereinafter referred to as IL-CCD) is generally used for the charge transfer part of the two-dimensional element. In this IL-CCD, as shown in FIG. 13, one potential well for vertical transfer is provided for one detector and signal charges are transferred in the vertical and horizontal directions by a so-called bucket brigading system. Although this IL-CCD has very low noise, there is a limitation in its charge transfer ability. More specifically, when the signal charge amount increases and signal charges from one pixel exceed the storage capacity of one bucket, the signal charges are mixed with those from another pixel. In order to avoid this, it is necessary to increase the dimension of the vertical CCD. However, when the dimension of vertical CCD is increased, the fill factor (the ratio of the photodetector area to the pixel size) decreases, resulting in a reduction in sensitivity.

As another charge transfer system, there is a MOS system utilizing a MOS switch for reading out signals. The MOS system has an advantage over other systems in having a larger saturation charge amount. However, it has a disadvantage in that a large noise arises due to a large signal line capacitance and fixed pattern noise arises due to variations in the characteristics of the MOS switch. Although a reduction in pixel size is required for miniaturization and high resolution, a reduction in the pixel size induces a reduction in the signal charge amount obtained from one pixel. Thus, noise is a serious problem in the MOS system.

On the other hand, a CSD (Charge Sweep Device) used in the device of FIG. 12 is a new vertical charge transfer element, which has a large saturation charge amount and a noise level as high as that of the IL-CCD.

A description is given of the operation of the CSD with reference to FIGS. 13 and 14, which are shown in pages 41 to 45 of a journal "Television Technology" of September 1985.

As shown in FIG. 13, the transfer gates a CSD are controlled separately from each other. Only a transfer gate is selected in a vertical row during a horizontal period. In FIG. 13, only the second transfer gate from the left is turned on and signal charges in the photodiode connected to the transfer gate are transferred to the CSD. Other photodiodes are accumulating signal charges at this time.

The above operation will be described in detail with reference to FIG. 14. In the CSD, the signal charges are transferred by the charge sweep-out operation, in which the potential wall pushes the signal charges to the horizontal CCD as shown in FIGS. 14(b) to 14(d). A storage gate is provided between the horizontal CCD and the CSD, and the swept signal charges are stored in the storage gate as shown in FIG. 14(e). The sweep-out operation is completed in a horizontal period and the signal charges stored in the storage gate are transferred to the horizontal CCD during a horizontal blanking period as shown in FIG. 14(f) and then they are successively read out.

As described above, in the CSD, one vertical transfer element forms one potential well and the signal charges from one photodiode are output to the potential well. Therefore, sufficient signal charges can be obtained even when the channel width is reduced.

FIG. 9 shows a structure of a conventional infrared solid-state imaging element including Schottky barrier diodes serving as photodetectors, CSDs serving as vertical charge transfer circuits and a CCD serving as a horizontal charge transfer circuit. In FIG. 9, reference numeral 1 designates infrared detectors such as PtSi/Si Schottky barrier diodes. Reference numeral 2 designates vertical CSDs for transferring signal charges and reference numeral 3 designates a CSD scanner for driving the vertical CSD 2. Reference numeral 4 designates transfer gates (TG) for controlling the charge transfer from the infrared detector 1 to the vertical CSD 2 and reference numeral 5 designates a TG scanner for driving the transfer gates 4. Reference numeral 6 designates bus lines connecting the transfer gates 4 with the TG scanner 5. Reference numeral 7 designates a horizontal CCD for transferring signal charges and reference numeral 8 designates a CCD scanner for driving the CCD 7. Reference numeral 9 designates an output amplifier.

Operation thereof will be described. Infared rays radiated from the subject are incident on the photodetectors 1 arranged in a two-dimensional array and then converted into electricity in the photodetector 1. The signal charges thus generated are transferred to the vertical CSD 2 by opening the transfer gate 4. The switching of the transfer gate 4 is controlled by the TG scanner 5 connected to the transfer gate 4 by the bus line 6. When, the CSD scanner circuit 3 is driven, the signal charges in the vertical CSD 2 are transferred downward in the CSD 2 to reach the horizontal CCD 7. When the CCD scanner 8 is operated, the signal charges in the horizontal CCD 7 are transferred in the right direction in the CCD 7 to be output through the output amplifier 9. Then, signals from the photodetectors 1 arranged in a two-dimensional array are successively read out, whereby the intensity distribution of the infrared rays incident on the element is displayed on the monitor as an infrared image.

FIG. 10 shows a structure of a conventional infrared solid state imaging element having Schottky barrier diodes as photodetectors in which the signal charges are read out by an MOS system. In FIG. 10, reference numeral 1 designates infrared detectors such as PtSi/Si Schottky barrier diodes. Reference numeral 10 designates vertical MOS transistors for reading out signal charges and reference numeral 11 designates a vertical scanner for controlling the switching of the vertical MOS transistors 10. Reference numeral 12 designates bus lines connecting the vertical MOS transistors 10 with the vertical scanner 11. Reference numeral 13 designates a horizontal MOS transistor for reading out signal charges and reference numeral 14 designates a horizontal scanner for controlling the switching of the horizontal MOS transistors 13. Reference numeral 15 designates bus lines connecting the horizontal MOS transistors 13 with the horizontal scanner 14. Reference numeral 9 designates an output amplifier.

Operation thereof will be described. Infared rays irradiated from the subject are incident on the photodetectors 1 arranged in a two-dimensional array and then converted into electricity in the photodetectors 1 similarly as in FIG. 9. The signal charges thus generated are read out by the MOS system. More specifically, the signal charges from the photodetector 1 provided where a bus line 12 in a transverse direction selected by the vertical scanner 11 intersects a bus line 15 in a longitudinal direction selected by the horizontal scanner 14 are output through the output amplifier 9. The signal charges from the photodetectors 1 arranged in a two-dimensional array are successively read out and then the intensity distribution of the infrared rays incident to the element are displayed on the monitor as an infrared image.

FIG. 11 shows a structure of a conventional infrared solid-state imaging element having Schottky barrier diodes as photodetectors and CCDs as vertical and horizontal charge transfer circuits. In FIG. 11, reference numeral 1 designates infrared detectors such as PtSi/Si Schottky barrier diodes. Reference numeral 13 designates vertical CCDs for transferring signal charges and reference numeral 14 designates a CCD scanner for driving the CCDs. Reference numeral 4 designates transfer gates (TG) for controlling the charge transfer from the infrared detectors 1 to the vertical CCD 13. Reference numeral 15 designates an input pin for inputting a clock signal for driving the transfer gates 4. Reference numeral 6 designates bus lines connecting the input pin 15 with the transfer gates 4. Reference numeral 7 designates a horizontal CCD for transferring signal charges and reference numeral 8 designates a CCD scanner for driving the horizontal CCD 7. Reference numeral 9 designates an output amplifier.

In this infrared imaging element, unlike the infrared imaging element shown in FIG. 9, a CCD is used for the charge transfer in vertical direction. The operation thereof is fundamentally the same as that of the element shown in FIG. 9 except that the switching of the transfer gate 4 is controlled by the clock signal applied to the input pin 15 and the vertical CCDs 13 are controlled by the CCD scanner 14.

The infrared solid-state imaging elements shown in FIGS. 9, 10 and 11 are formed by a silicon LSI process. During the process, breakage of Al wirings for the bus lines 6, 12 and 15 may occur.

When the bus line 6 is broken in the infrared solid state elements shown in FIGS. 9 and 11, the transfer gate 4 on the right of the broken bus line in the figure cannot be opened and the signal charges from the photodetectors 1 cannot be read out. As a result, in the solid-state imaging element including such a broken bus line, an image defect A having continuous insensitive portions in the transverse direction as shown in FIG. 15 appears on the output image.

When the bus lines 12 and 15 are broken in the infrared solid-state imaging element shown in FIG. 10, an image defect A or B having continuous insensitive portions in the transverse direction or the longitudinal direction appears on the output image. In addition, when a diode is faulty or a contact part of the transfer gate is open, a black spot defect C as shown in FIG. 15 appears.

As a method for detecting such defects, the output image of an assembled is detected. This causes elements including defects to pass through a wafer test process or an assembly process, so that much time and a high cost are unfavorably incurred.

As another method for detecting these defects, the element may be driven in a wafer test. In a case of an infrared imaging element using Schottky barrier diodes, it is necessary to cool the element down to approximately 77K to operate the detector. However, it is technically difficult to perform a wafer test at such a low temperature.

SUMMARY OF THE INVENTION

It is an object of the present invention to provide a solid-state infrared imaging element which can detect a transverse black line defect or a longitudinal black line defect, i.e., a breakage of a bus line in a wafer test without actually operating the element.

Other objects and advantages of the present invention will become apparent from the detailed description given hereinafter; it should be understood, however, that the detailed description and specific embodiment are given by way of illustration only, since various changes and modifications within the spirit and the scope of the invention will become apparent to those skilled in the art from this detailed description.

In accordance with the present invention, a solid state imaging element includes a checking means for detecting a breakage of a bus line.

Therefore, the breakage of a bus line can be detected at room temperature without actually operating the element.

BRIEF DESCRIPTION OF THE DRAWINGS

FIG. 3 is a schematic diagram of an infrared imaging element which reads out signal charges using an MOS system in accordance with a second embodiment of the present invention;

DETAILED DESCRIPTION OF THE PREFERRED EMBODIMENTS

Embodiments of the present invention will be described in detail with reference to the drawings.

Figure 1:
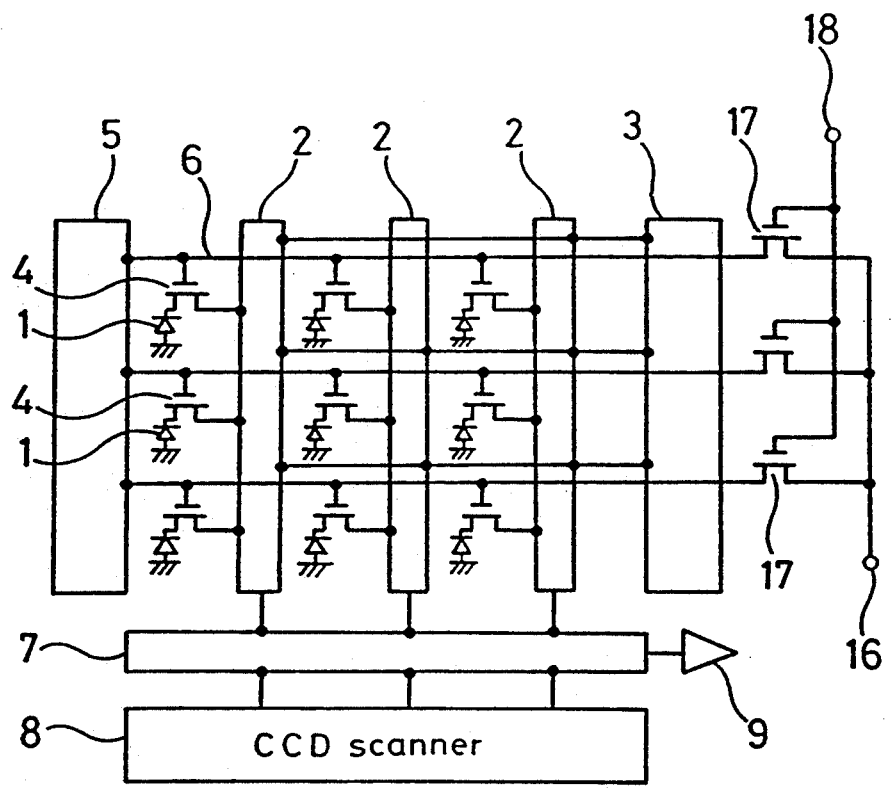
FIG. 1 is a schematic diagram of an infrared imaging element which reads out signal charges using a CSD system in accordance with a first embodiment of the present invention.
Figure 2:
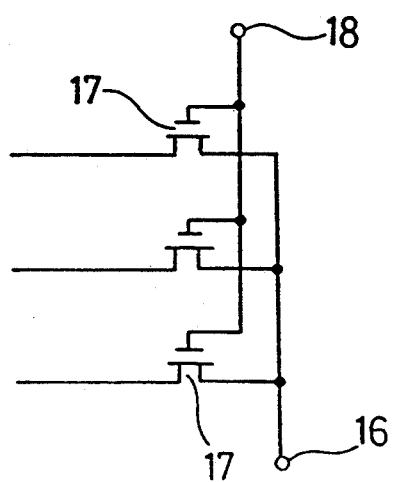
FIG. 2 is a schematic diagram showing a fundamental structure of a bus line breakage checking circuit in accordance with the first embodiment of the present invention.

FIG. 1 is a schematic diagram showing a structure of an infrared imaging element which reads out signal charges using a CSD system in accordance with a first embodiment of the present invention. FIG. 2 is a schematic diagram showing a fundamental structure of a bus line breakage checking circuit in accordance with the present invention.

Figure 9:
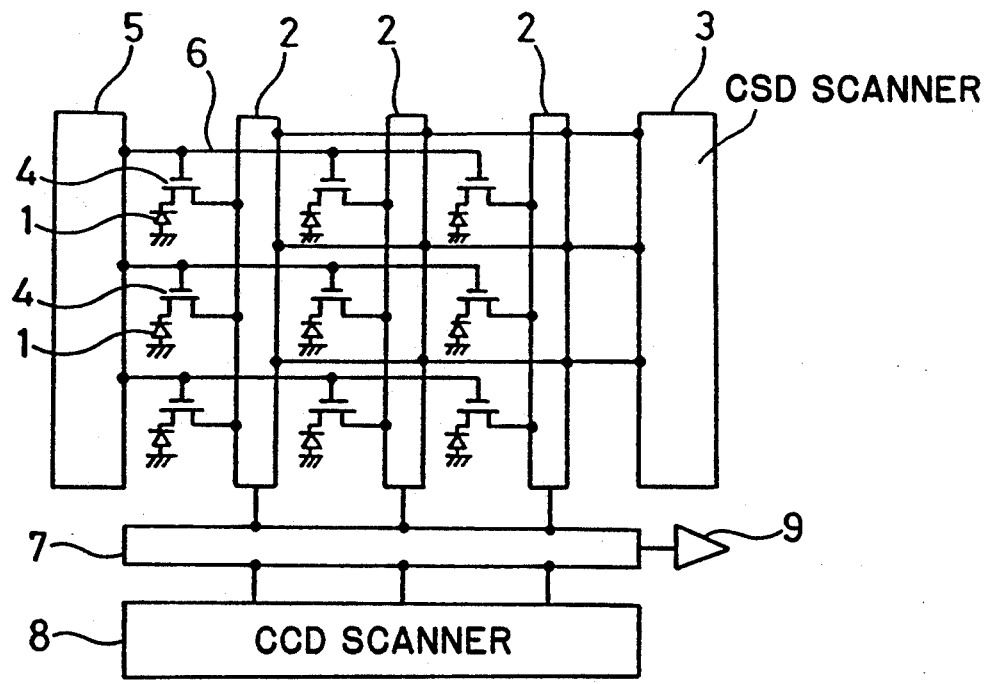
FIG. 9 is a schematic diagram of an infrared imaging element using a CSD system in accordance with the prior art.

In FIG. 1, reference numerals 1 to 9 designate the same elements as those shown in FIG. 9. Reference numeral 16 designates a pad for detecting breakage of a wire in transverse direction from the outside. Each bus line 6 is connected with the pad 16 by the transistors 17. Reference numeral 18 designates a gate voltage applying pad for controlling the switching of the transistors 17. The transistors 17 and the pads 16 and 18 are part of a circuit for detecting breakage of a bus line.

When this infrared imaging element is operated, the pad 18 is short-circuited with the substrate to turn off the transistors 17. At this time, the breakage checking circuit is electrically isolated from the bus line 6 and then an infrared image is obtained by the same operation as in the conventional example of FIG. 9.

When the breakage of a bus line is to be detected, a wafer test is carried out in accordance with the following process. First, a gate voltage is applied to the pad 18 to turn on the transistors 17, thereby to connect the pad 16 with the bus lines 6. In this state, the TG scanner 5 is operated and a pulse voltage applied to each bus line 6 by the scanner circuit 5 is monitored from the pad 16. The TG scanner 5 applies a high level to a selected bus line and a low level to other non-selected bus lines while the element operates. When the breakage checking circuit is connected, however, a current flows from the selected bus line to the non-selected bus lines via this breakage checking circuit, so that normal scanning is not carried out. Therefore, in this wafer test, the non-selected bus lines are open, and a low level signal is not applied to these bus lines. The pulses monitored from the pad 16 are pulses sent from the scanner 5 when there is no breakage of the bus line, while a lack of pulses of the same number as the number of broken bus lines occurs when there is breakage of the bus line. Thus, breakage of the bus line is detected.

Figure 10:
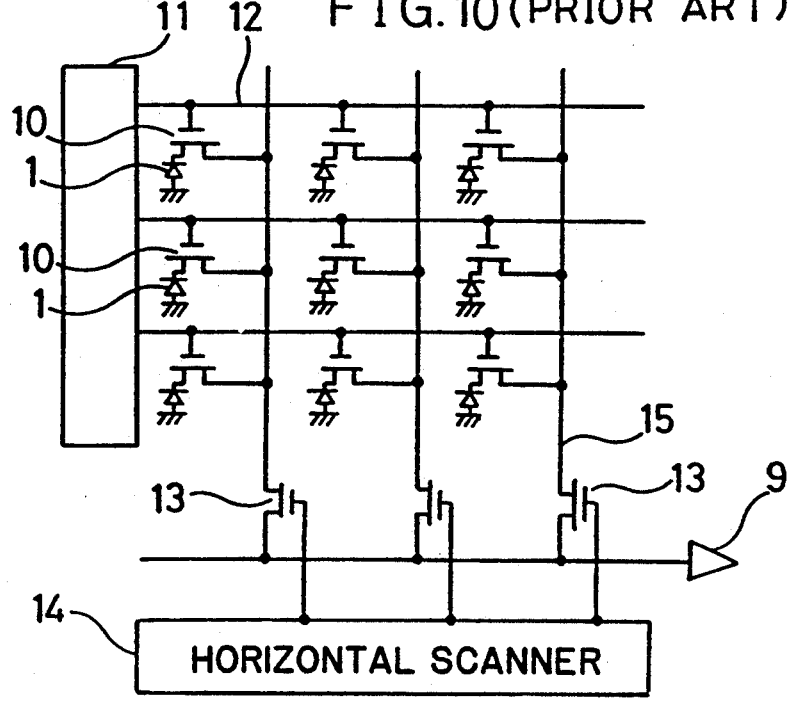
FIG. 10 is a schematic diagram of an infrared imaging system using an MOS system in accordance with the prior art.

FIG. 3 is a schematic diagram showing a structure of an infrared imaging element which reads out signal charges using an MOS system in accordance with a second embodiment of the present invention. In FIG. 3, reference numerals 1 and 9 to 15 designate the same elements as those shown in FIG. 10. Reference numeral 19 designates a pad for detecting breakage of bus lines 12 in a transverse direction. Each bus line in the transverse direction is connected with the pad 19 by the transistors 20. Reference numeral 21 designates a gate voltage applying pad for controlling the switching of the transistors 20. Reference numeral 22 designates a pad for detecting breakage of bus lines 15 in a longitudinal direction. Each bus line in the longitudinal direction is connected with the pad 22 by the transistors 23. Reference numeral 24 designates a gate voltage applying pad for controlling the switching of the transistors 23. The transistors 20 and the pads 19 and 21 are part of a bus line breakage checking circuit in the transverse direction and the transistors 23 and the pads 22 and 24 are included in a bus line breakage checking circuit in the longitudinal direction.

In this second embodiment, the two breakage checking circuits 19 to 21 and 22 to 24 have the same structure as that of the breakage checking circuit shown in FIG. 2. Accordingly, a wafer test can be carried out in accordance with the same process as described in the first embodiment of the present invention. More specifically, when the element is operated, the pads 21 and 24 are short-circuited with the substrate to turn off the transistors 20 and 23. At this time, the two breakage checking circuits are electrically isolated from the bus lines 12 and 15 and an infrared image can be obtained by the same operation as in the conventional example of FIG. 10.

When, the breakage of the bus line in the transverse direction is detected, the pulse from the vertical scanner 11 is monitored by the pad 19 in the same way as in the first embodiment. When the breakage of the bus line in the longitudinal direction is detected, the pulse from the horizontal scanner 14 is monitored by the pad 22.

While the breakage checking circuits of above-described first and second embodiments are appropriate for detecting which bus line is broken, third to fifth embodiments which will be described, hereinafter provide breakage checking circuits for detecting only the existence of a broken bus line.

Figure 4:
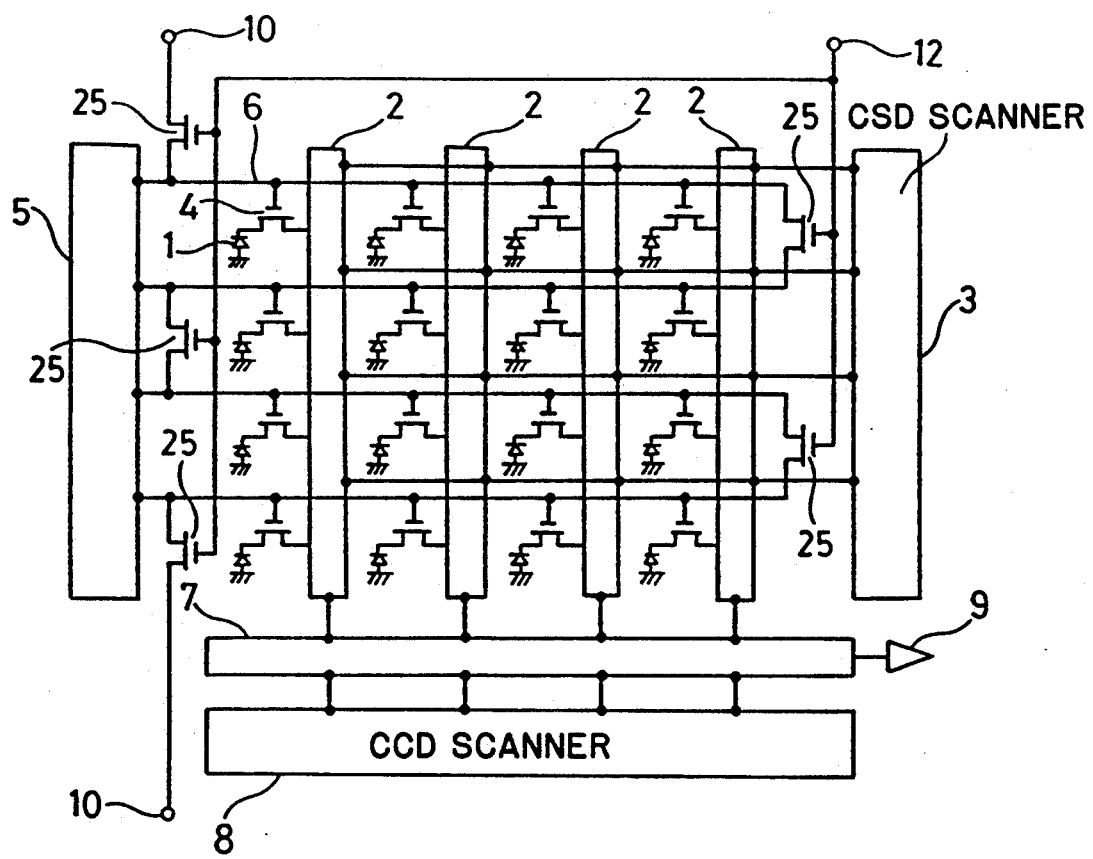
FIG. 4 is a schematic diagram of an infrared imaging element which reads out signal charges using a CSD system in accordance with a third embodiment of the present invention.
Figure 5:
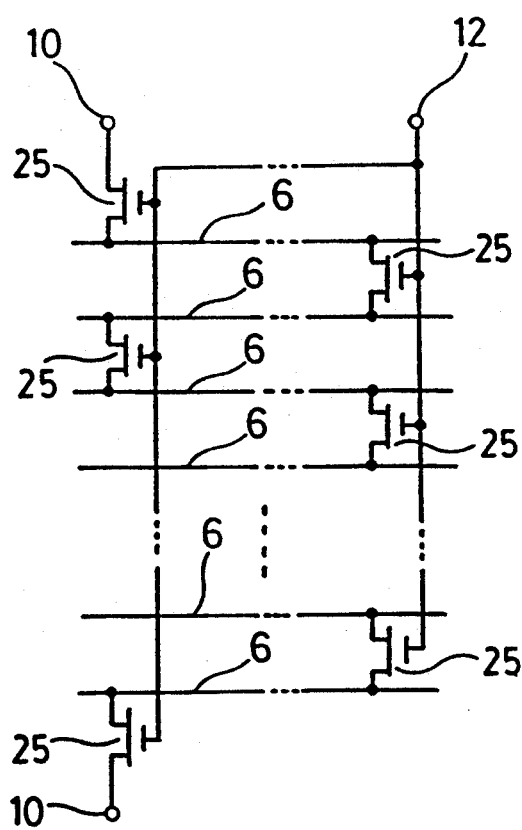
FIGS. 5 and 6 are schematic diagrams showing fundamental structures of bus line breakage checking circuits in accordance with the third embodiment of the present invention.
Figure 6:
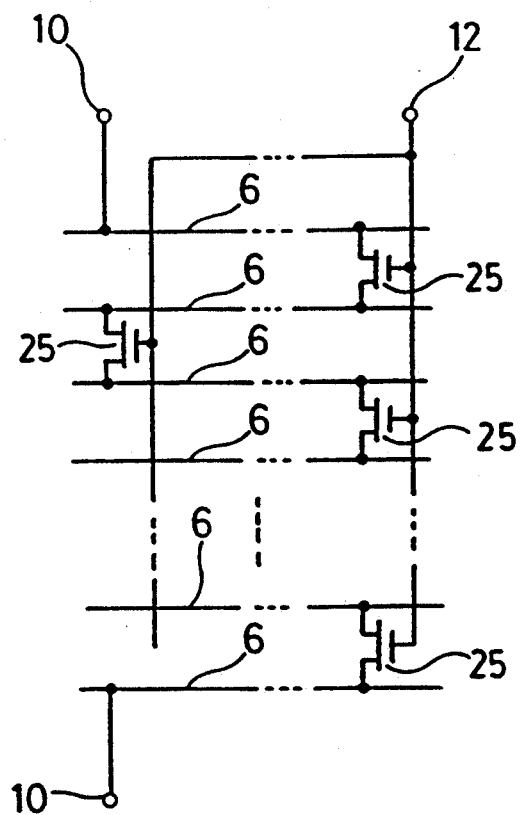

FIG. 4 is a schematic diagram showing a structure of an infrared imaging element which reads out signal charges with a CSD system in accordance with a third embodiment of the present invention. FIGS. 5 and 6 are schematic diagrams showing fundamental structures of the breakage checking circuits.

In FIG. 4, reference numerals 1 to 9 designate the same elements as those shown in FIG. 9. Reference numeral 10 designates two pads for detecting breakage of a bus line. All bus lines are connected in series with the two pads 10 by the transistors 25. Reference numeral 12 designates a gate voltage applying pad for controlling the switching of the transistors 25. The transistors 25 and the pads 10 and 12 constitute are part of a breakage checking circuit.

FIG. 5 shows the breakage checking circuit of the infrared imaging element of FIG. 4. In these figures, reference numerals 10 to 12 designate the same elements as those shown in FIG. 4 and reference numeral 6 designates n bus lines.

In the infrared imaging element of FIG. 4, when the element is operated, the pad 12 is short circuited with the substrate to turn off the transistor 25. At this time, the breakage checking circuit is electrically isolated from the bus line 6 and then an infrared image is obtained by the same operation as in the conventional example of FIG. 9.

When breakage of the bus line is detected, a wafer test is carried out in accordance with the following process. First, the CSD scanner 3 is electrically isolated from the TG scanner 5. In this state, the circuit shown in FIG. 4 is electrically equivalent to the circuit shown in FIG. 5. In FIG. 5, a gate voltage is applied to the pad 12 to turn on the transistors 25, thereby to connect the two pads 10 in series with the n bus lines. In this state, whether current flows between the two pads 10 or not is checked, whereby the breakage of bus line can be detected.

In FIG. 5, the breakage checking circuit includes n bus lines 6 and (n+1) transistors 25. This breakage checking circuit can bus lines 6 and (n−1) transistors 25 as shown in FIG. 6.

Figure 7:
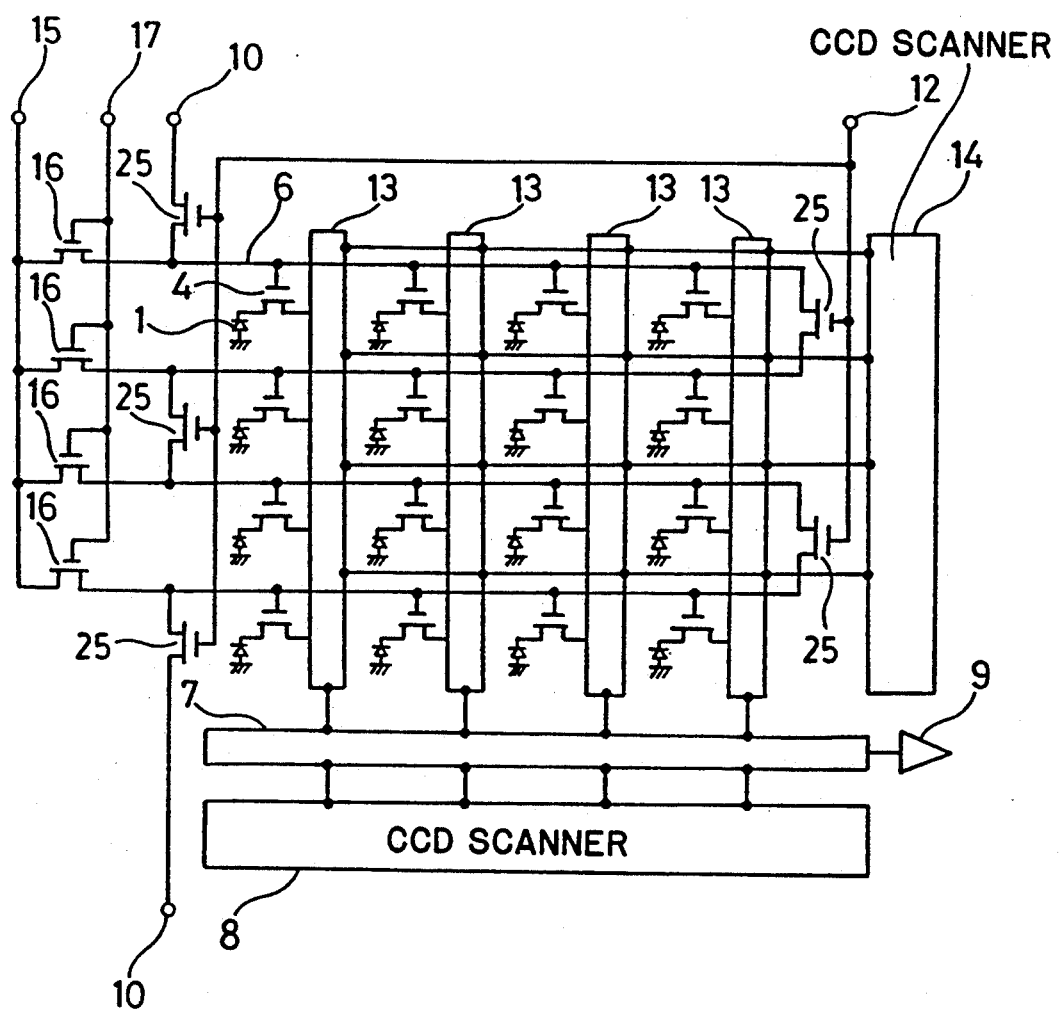
FIG. 7 is a schematic diagram of an infrared imaging element which reads out signal charges using a CCD system in accordance with a fourth embodiment of the present invention.
Figure 11:
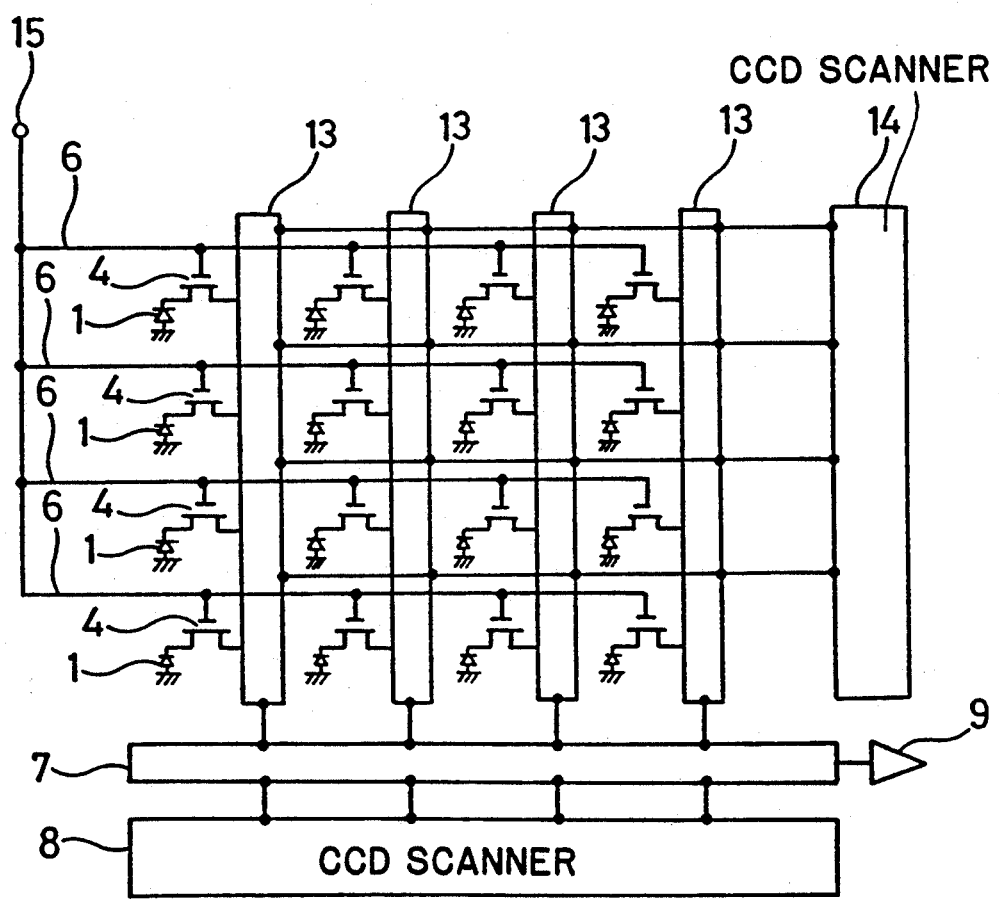
FIG. 11 is a schematic diagram of an infrared imaging element using a CCD system in accordance with the prior art.
Figure 12:
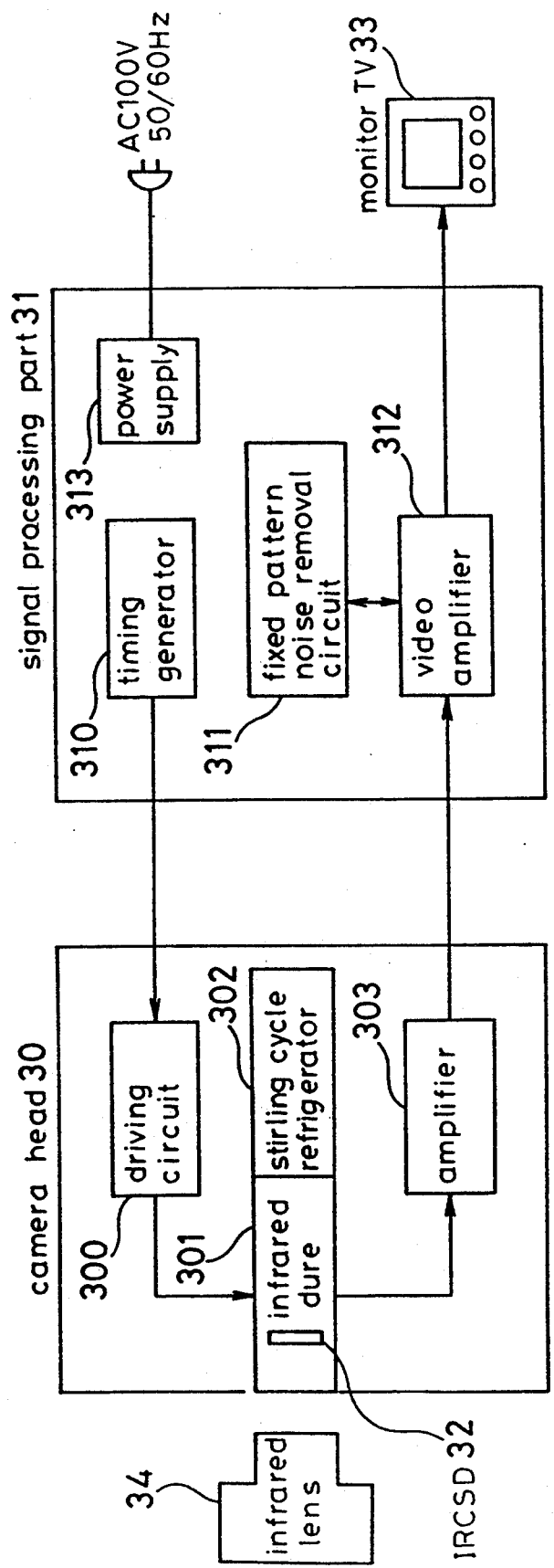
FIG. 12 is a block diagram of an infrared imaging device.
Figure 13:
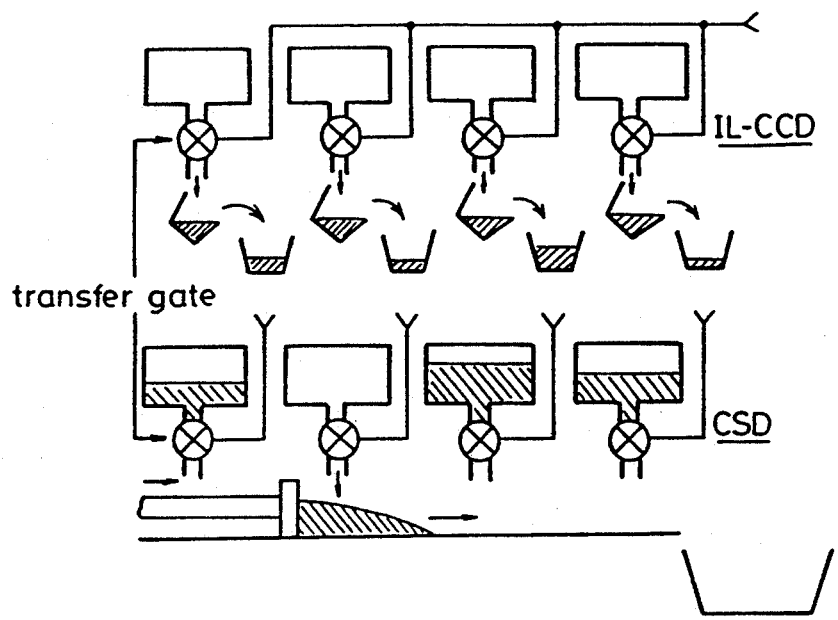
FIGS. 13 and 14 are diagrams showing a structure and a charge sweep-out operation of a basic CSD system.
Figure 14:
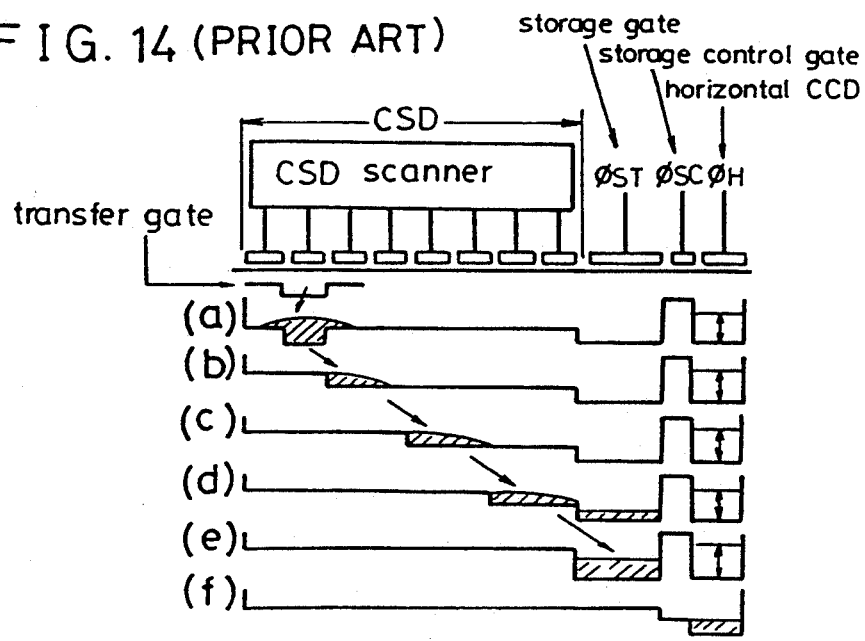
Figure 15:
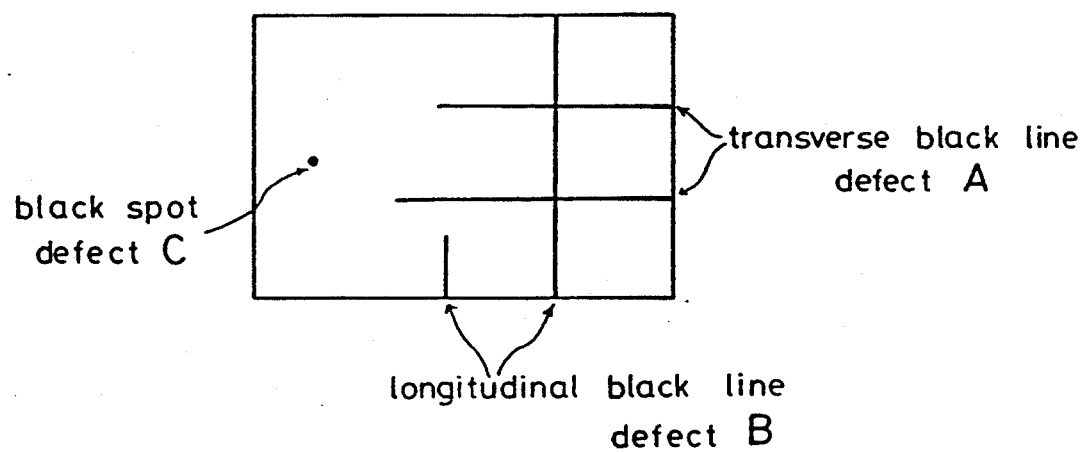
FIG. 15 is a diagram showing image defects appearing on an output image.

FIG. 7 is a schematic diagram showing a structure of an infrared imaging element which reads out signal charges using a CCD system in accordance with a fourth embodiment of the present invention. In FIG. 7, reference numerals 1, 4, 6 to 9, and 13 to 15 designate the same elements as those shown in FIG. 11. Reference numerals 10 to 12 designate the breakage checking circuit shown in FIG. 5. Reference numeral 16 designates transistors connecting each bus line 6 in the transverse direction with the input pin 15, and reference numeral 17 designates a gate voltage applying pad for controlling the switching of the transistors 16.

When this infrared imaging element operates, the pad 12 is short circuited with the substrate to turn off the transistors 25, whereby the breakage checking circuit is electrically isolated from the bus lines 6. Then, a gate voltage is applied to the pad 17 to turn on the transistors 16, whereby the clock input pin 15 is connected in parallel with each bus line 6. In this state, the circuit shown in FIG. 7 is electrically equivalent to the circuit shown in FIG. 11 and an infrared image can be obtained by the same operation as in the conventional example of FIG. 11.

When breakage of the bus line is detected, the pad 17 is short circuited with the substrate to turn off the transistors 16, whereby the bus lines connected in parallel are electrically isolated from each other. Then, the CCD scanner 14 is electrically isolated from the vertical CCD. In this state, the circuit shown in FIG. 7 is electrically equivalent to the circuit shown in FIG. 5 and the breakage of bus line can be detected in the same way as in the third embodiment.

Figure 8:
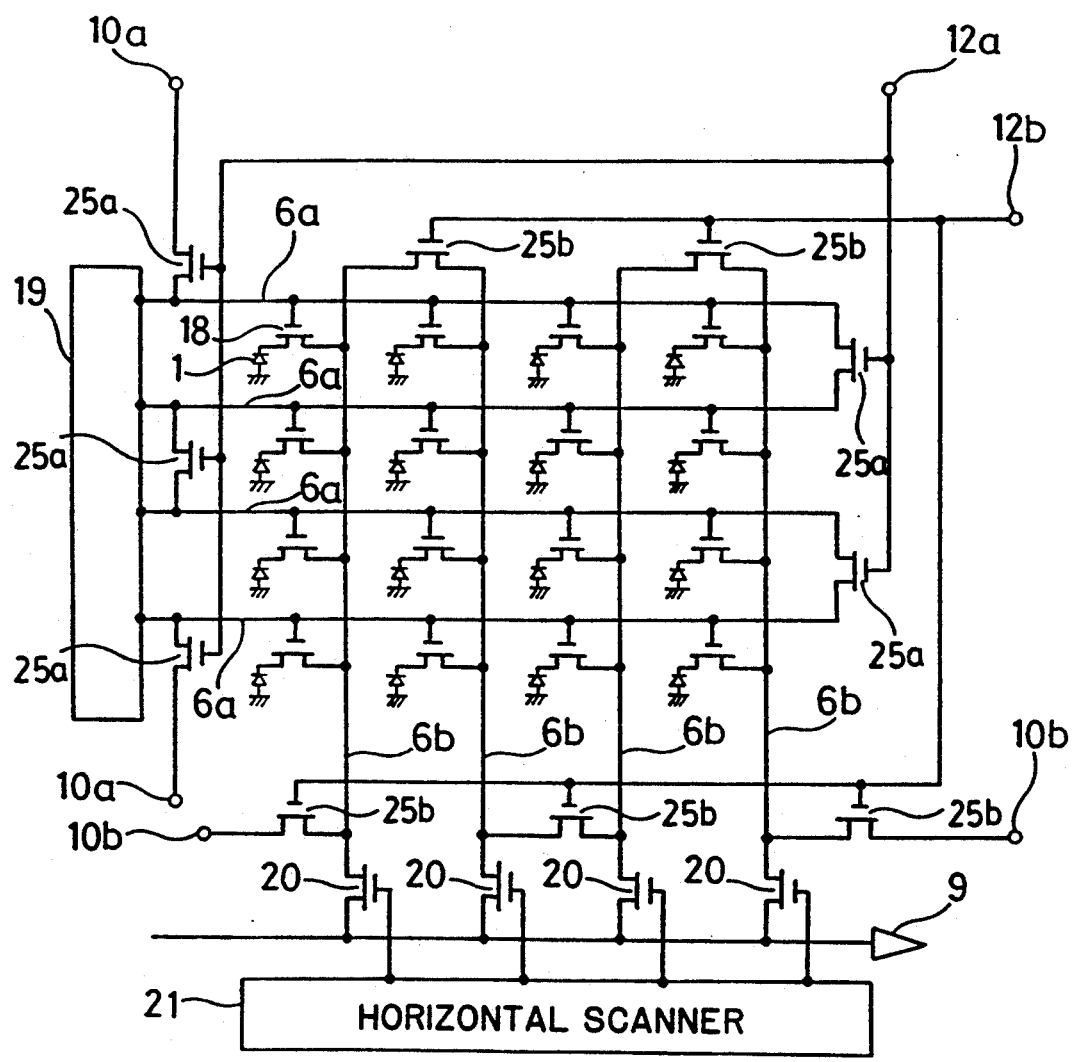
FIG. 8 is a schematic diagram of an infrared imaging element which reads out signal charges using an MOS system in accordance with a fifth embodiment of the present invention.

FIG. 8 is a schematic diagram showing a structure of an infrared imaging element which reads out signal charges using a MOS system in accordance with a fifth embodiment of the present invention. In FIG. 8, reference numerals 1, 6a, 6b, 9, 18 to 21 designate the same elements as those shown in FIG. 10. Reference numerals 10a to 12a and 10b to 12b designate the breakage checking circuit shown in FIG. 5, respectively.

The infrared imaging element of using an MOS system shown in FIG. 8 has the bus lines 6a in the longitudinal direction and the bus lines 6b in the transverse direction. Therefore, this infrared imaging element has a structure in which the breakage checking circuit shown in FIG. 5 is provided in the transverse direction and the longitudinal direction of the infrared imaging element shown in FIG. 10. When the element is operated, the breakage checking circuit 10a to 12a and the breakage checking circuit 10b to 12b are electrically isolated from each other, and then an infrared image can be obtained by the same operation as in the conventional example of FIG. 10. In addition, when the vertical scanner 19 and the horizontal scanner 21 are electrically isolated from each other, the circuit shown in FIG. 8 is equivalent to the two breakage checking circuits shown in FIG. 5, so that the breakage of the bus line can be detected in the both directions in the same way as in the above third embodiment.

In the above-described first to fifth embodiments, infrared imaging elements using Schottky barrier diodes for the photodetectors are described. However, the present invention can be applied to infrared imaging elements or visible imaging elements using other photodetectors.

In addition, as the signal reading out systems, a CSD system, a CCD system, and an MOS system are used in the above embodiments. However, the breakage of the bus line can be detected using the breakage checking circuit of FIG. 5 or 6 also in a solid state imaging element having another reading out system, as far as it has bus lines in the transverse direction or longitudinal direction.

In the above described first to fifth embodiments, since a breakage checking circuit for detecting breakage of a bus line is provided in an infrared imaging element, it is possible to detect which bus line is broken in the first and second embodiments, and it is possible to detect the existence of a broken bus line in the third and fourth embodiments. Therefore, the time required for and cast of the wafer test process and the assembly process are reduced. In addition, since an identification of the broken bus line can be performed in the wafer test, the breakage checking circuit of the present invention is also effective for failure analysis.

What is claimed is:

1. A solid state imaging element comprising:
  a plurality of photodetectors arranged in a two-dimensional array on a semiconductor substrate;
  first and second charge transfer circuits for transferring signal charges in a vertical direction and a horizontal direction, respectively;
  a plurality of transfer gates for controlling charge transfer from respective photodetectors to one of said first and second charge transfer circuits;
  a scanner for controlling switching of said transfer gates;
  a plurality of bus lines connecting said transfer gates with said scanner; and
  bus line breakage checking means including a plurality of transistors connected in series with respective bus lines, a test pad connected to said bus lines through said transistors, and a voltage applying pad connected to said transistors for applying a voltage to control switching of said transistors.

2. A solid state imaging element of claim 1 wherein a gate voltage is applied to said voltage applying pad to turn on said transistors, said test pad is connected with said bus lines to operate said scanner, a voltage is applied to a selected bus line, non-selected bus lines are opened and electrically isolated, and a pulse voltage applied to said bus lines by said scanner is monitored from said test pad.

3. A solid state imaging element of claim 1 wherein said photodetectors are Schottky barrier diodes.

4. A solid state imaging element of claim 1 wherein said first and second charge transfer circuits are charge coupled devices.

5. A solid state imaging element of claim 1 wherein said first circuit is a charge sweep device and said second circuit is a charge coupled device.

6. A solid state imaging element comprising:
a plurality of photodetectors arranged in a two-dimensional array on a semiconductor substrate;
a plurality of MOS transistors for reading out signal charges and connected with respective photodetectors;
first and second scanner circuits respectively disposed in a vertical direction and a horizontal direction for controlling reading out of signal charges;
a plurality of bus lines disposed along the vertical and the horizontal directions connecting said MOS transistors with said scanner circuits; and
at least one bus line breakage checking means for the vertical direction and one bus line breakage checking means for the horizontal direction, each bus line breakage checking means including a plurality of second transistors connected in series with respective vertical direction and horizontal direction bus lines, a test pad connected with said second transistors through said bus lines, and a voltage applying pad connected to said second transistors for applying a voltage to control switching of said second transistors.

7. A solid state imaging element of claim 6 wherein when the breakage of said horizontal direction bus line is detected, a gate voltage is applied to said voltage applying pad to turn on said transistors, said test pad is connected with said bus lines to operate said scanner, a voltage is applied to a selected bus line, non-selected bus lines are opened to be electrically isolated, and a pulse from said vertical scanner is monitored by said test pad in the horizontal direction; and
when the breakage of said bus line in vertical direction is detected, a pulse from said horizontal scanner is monitored from said test pad in the vertical direction.

8. A solid state imaging element of claim 6 wherein said photodetectors are Schottky barrier diodes.

9. A solid state imaging element comprising:
a plurality of photodetectors arranged in a two-dimensional array on a semiconductor substrate;
first and second circuits for reading out signal charges in a vertical direction and a horizontal direction, respectively;
a plurality of gated transistors for controlling charge transfer from respectively photodetectors to said first and second circuits;
a scanner for controlling the switching of said gated transistors;
a plurality of bus lines in a transverse direction and a plurality of bus lines in a longitudinal direction respectively connecting gated transistors with said scanner; and
at least one bus line breakage checking means including a plurality of second transistors for connecting said bus lines in a transverse direction in series and for connecting said bus lines in a longitudinal direction in series, two test pads disposed at and connected to respective ends of said bus lines through said second transistors, and a gate voltage applying pad connected to said transistors for applying a voltage to control switching of said second transistors.

10. A solid state imaging device element of claim 9 including an external clock input pin connected to said gated transistors through said bus lines for controlling switching of said gated transistors.

11. A solid state imaging element of claim 9 wherein when the breakage of a bus line is detected, said voltage applying pad is short circuited with said substrate, said transistors are turned off to open the parallel connection of said bus lines, said scanner is electrically isolated, and said two test pads are serially connected with n bus lines to detect whether current flows between said two pads.

12. A solid state imaging element of claim 9 wherein said photodetectors are Schottky barrier diodes.

13. A solid state imaging element of claim 3 wherein said first and second circuits are charge coupled devices.

* * * * *